(12) United States Patent
Miyazoe et al.

(10) Patent No.: US 11,092,255 B2
(45) Date of Patent: Aug. 17, 2021

(54) MANIFOLD ASSEMBLY FOR ELECTROMAGNETIC VALVE AND ELECTROMAGNETIC VALVE CLUSTER USING SAME

(71) Applicant: SMC CORPORATION, Tokyo (JP)

(72) Inventors: Shinji Miyazoe, Moriya (JP); Kazuhiro Noguchi, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 445 days.

(21) Appl. No.: 15/779,690

(22) PCT Filed: Aug. 26, 2016

(86) PCT No.: PCT/JP2016/074927
§ 371 (c)(1),
(2) Date: May 29, 2018

(87) PCT Pub. No.: WO2017/104179
PCT Pub. Date: Jun. 22, 2017

(65) Prior Publication Data
US 2020/0309279 A1    Oct. 1, 2020

(30) Foreign Application Priority Data
Dec. 14, 2015    (JP) .............................. JP2015-243265

(51) Int. Cl.
*F16K 27/00*    (2006.01)
*F16K 27/04*    (2006.01)
*F16K 47/02*    (2006.01)

(52) U.S. Cl.
CPC .......... *F16K 27/003* (2013.01); *F16K 27/041* (2013.01); *F16K 27/048* (2013.01); *F16K 47/023* (2013.01)

(58) Field of Classification Search
CPC .... F16K 27/003; F16K 27/041; F16K 27/048; F16K 47/023; F15B 13/0803; F15B 13/0807; F15B 13/0814; F15B 13/0817
See application file for complete search history.

(56) References Cited

U.S. PATENT DOCUMENTS 7,591,280 B2    9/2009    Narita et al.
2006/0283509 A1    12/2006    Narita et al.

FOREIGN PATENT DOCUMENTS

CN    1884851 A    12/2006
CN    2921493 Y    7/2007

(Continued)

OTHER PUBLICATIONS

Machine Translation of JP2006226377A, retrieved Sep. 28, 2020 (Year: 2006).*

(Continued)

*Primary Examiner* — Michael R Reid
(74) *Attorney, Agent, or Firm* — Oblon, McClelland, Maier & Neustadt, L.L.P.

(57) ABSTRACT

A manifold block is provided with attachment grooves for attaching silencer members and a plurality of individual exhaust paths that are branched from the attachment grooves and open on fixing regions of a valve mounting surface. Openings along the axes of the attachment grooves are formed as exhaust ports in lightening grooves on the bottom surface of the manifold block. The silencer members are held in the attachment grooves. The individual exhaust paths communicate with the exhaust ports through the silencer members.

15 Claims, 10 Drawing Sheets

(56) References Cited

FOREIGN PATENT DOCUMENTS

| | | |
|---|---|---|
| CN | 202528966 U | 11/2012 |
| CN | 103032606 A | 4/2013 |
| CN | 203230964 U | 10/2013 |
| CN | 105065728 A | 11/2015 |
| JP | 2-27074 U | 2/1990 |
| JP | 4-290602 A | 10/1992 |
| JP | 2006-226377 A | 8/2006 |
| JP | 2007-32831 A | 2/2007 |
| JP | 2009-257554 A | 11/2009 |

OTHER PUBLICATIONS

International Search Report dated Nov. 15, 2016 in PCT/JP2016/074927, filed Aug. 26, 2016.

Combined Chinese Office Action and Search Report dated Jul. 2, 2019 in Chinese Patent Application No. 201680073254.3 (with English translation), 17 pages.

* cited by examiner

MANIFOLD ASSEMBLY FOR ELECTROMAGNETIC VALVE AND ELECTROMAGNETIC VALVE CLUSTER USING SAME

TECHNICAL FIELD

The present invention relates to a manifold assembly for mounting a plurality of thereon electromagnetic valves, and an electromagnetic valve cluster having electromagnetic valves mounted, and more particularly, it relates to a manifold assembly in which a silencer member for exhaust is incorporated in a manifold block of the manifold assembly.

BACKGROUND ART

Conventionally, a manifold for mounting a plurality of electromagnetic valves, such as that described in PTL 1 and PTL 2, is known, and the manifold is provided with a collective air supply flow path and a collective exhaust flow path which are provided along the longitudinal axis of the manifold block, and a plurality of air supply communication holes and exhaust communication holes branched from the collective air supply flow path and the collective exhaust flow path and opening on the upper surface (electromagnetic valve mounting surface) of the manifold block. When using the manifold, a pipe for supplying compressed air is connected to the opening of the collective air supply flow path opened on the end face of the manifold block, and the electromagnetic valves are mounted on the electromagnetic valve mounting surface so as to correspond to the plurality of air supply communication holes and exhaust communication holes.

Incidentally, similarly to the collective air supply flow path, the opening of the above-mentioned collective exhaust flow path is opened on the end face of the manifold block, but in order to suppress the exhaust sound, there are cases where a silencer is attached afterward to the opening by the user. So, the applicant proposed a manifold for an electromagnetic valve having a silencer in advance in PTL 3. However, since the silencer is additionally attached to the opening of the conventional collective exhaust flow path, there is still room for rationalization in design.

CITATION LIST

Patent Literature

PTL 1: Japanese Unexamined Patent Application Publication No. 2007-032831
PTL 2: Japanese Unexamined Patent Application Publication No. 2009-257554
PTL 3: Japanese Unexamined Patent Application Publication No. 2006-226377

SUMMARY OF INVENTION

Technical Problem

The present invention has been made in view of the above circumstances, and a technical object thereof is to provide a manifold assembly for an electromagnetic valve that enables a more rational design of a manifold block by incorporating a silencer member for suppressing exhaust sound from an electromagnetic valve into a manifold block, and an electromagnetic valve cluster using the manifold assembly.

Solution to Problem

To solve the above technical problem, the present invention provides a manifold assembly for an electromagnetic valve for mounting a plurality of electromagnetic valves side by side, the manifold assembly comprising: a manifold block having a valve mounting surface on which a plurality of fixing regions for fixing the electromagnetic valves are arranged side by side, and an air supply passage that opens on the fixing regions of the valve mounting surface and are for supplying compressed air to the electromagnetic valves; and silencer members for suppressing exhaust sound of exhaust discharged from the electromagnetic valves. The manifold block further includes attachment grooves for attaching the silencer members and a plurality of individual exhaust paths that are branched from the attachment grooves and open on the fixing regions of the valve mounting surface, openings along the axes of the attachment grooves are formed as exhaust ports on the outer peripheral surface of the manifold block, and the silencer members are held in the attachment grooves. The individual exhaust paths communicate with the exhaust ports through the silencer members.

In the manifold assembly for an electromagnetic valve according to the present invention, it is preferable that the attachment grooves be formed along the direction in which the fixing regions are arranged side by side on the valve mounting surface, and penetrate between both end faces of the manifold block. In this case, it is more preferable that brackets be detachably fixed to both end faces of the manifold block, and end openings of the attachment grooves that open on both end faces of the manifold block be covered by the brackets. The silencers members may be held in the attachment grooves by being fixed with an adhesive in the attachment grooves.

Alternatively, it is preferable that lightening grooves extend on the bottom surface of the manifold block along the attachment grooves, and the exhaust ports be opened in the groove walls of the lightening grooves. In this case, it is preferable that elastic members having spring elasticity be attached to the lightening grooves by elastic force thereof in a state of being elastically deformed, the elastic members abut on the silencer members in the attachment grooves through the exhaust ports, and the silencer members be thereby held in the attachment grooves. It is more preferable that the elastic members be pressed against the silencer members by elastic force generated by the elastic deformation.

Further, the supply flow path may include a collective air supply path for collectively flowing compressed air to be supplied to the plurality of electromagnetic valves and a plurality of individual air supply paths that are branched from the collective air supply path and open on the valve mounting surface, and the collective air supply path may be parallel to the attachment grooves and may penetrate between both end faces of the manifold block. In this case, the attachment grooves may be provided on both sides of the collective air supply path.

Further, in the manifold assembly for an electromagnetic valve according to the present invention, it is preferable that the silencer members include a sound-deadening material, and the sound-deadening material be disposed at least at the junctions with the individual exhaust paths in the attachment grooves. In this case, it is more preferable that the silencer members be integrally molded of the sound-deadening material in a stick shape having substantially the same cross-section as the attachment grooves, and have substantially the same axial length as the attachment grooves.

The above technical problem can also solved by an electromagnetic valve cluster including a plurality of electromagnetic valves mounted on the fixing regions of the valve mounting surface of the manifold assembly for an electromagnetic valve.

Advantageous Effects of Invention

As described above, in the manifold assembly of the present invention, since a configuration is adopted in which a plurality of individual exhaust paths leading to the fixing regions for the electromagnetic valves are branched from the attachment grooves in which the silencer members are attached, and the silencer member is incorporated in the manifold block, for example, more rational design of the manifold block, such as reduction in size and weight of the manifold block, becomes possible.

DESCRIPTION OF EMBODIMENTS

Hereinafter, the manifold assembly for an electromagnetic valve according to the present invention will be described in detail with reference to the drawings. FIGS. 1 to 7 show a manifold assembly 1A for an electromagnetic valve according to a first embodiment of the present invention.

Figure 1:
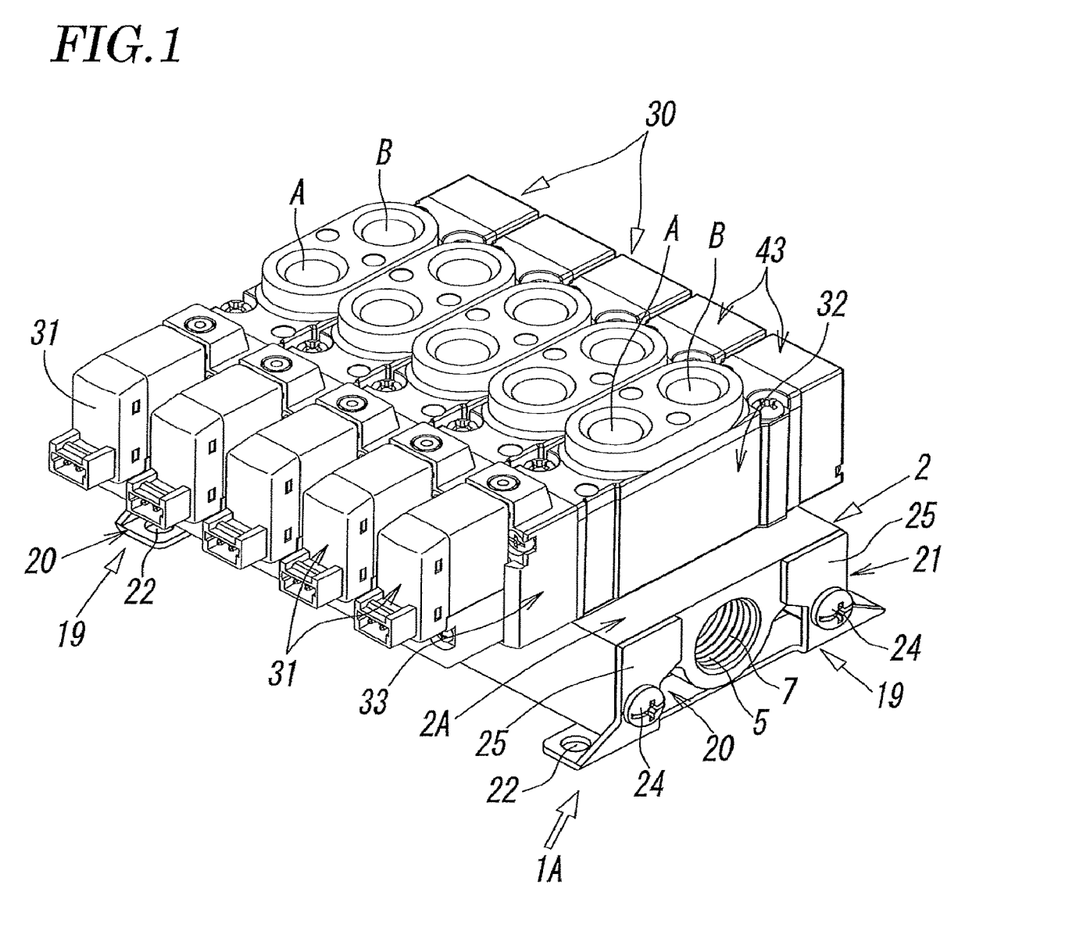
FIG. 1 is an external perspective view showing an electromagnetic valve cluster having a plurality of electromagnetic valves mounted on a manifold assembly for an electromagnetic valve according to a first embodiment of the present invention.
Figure 2:
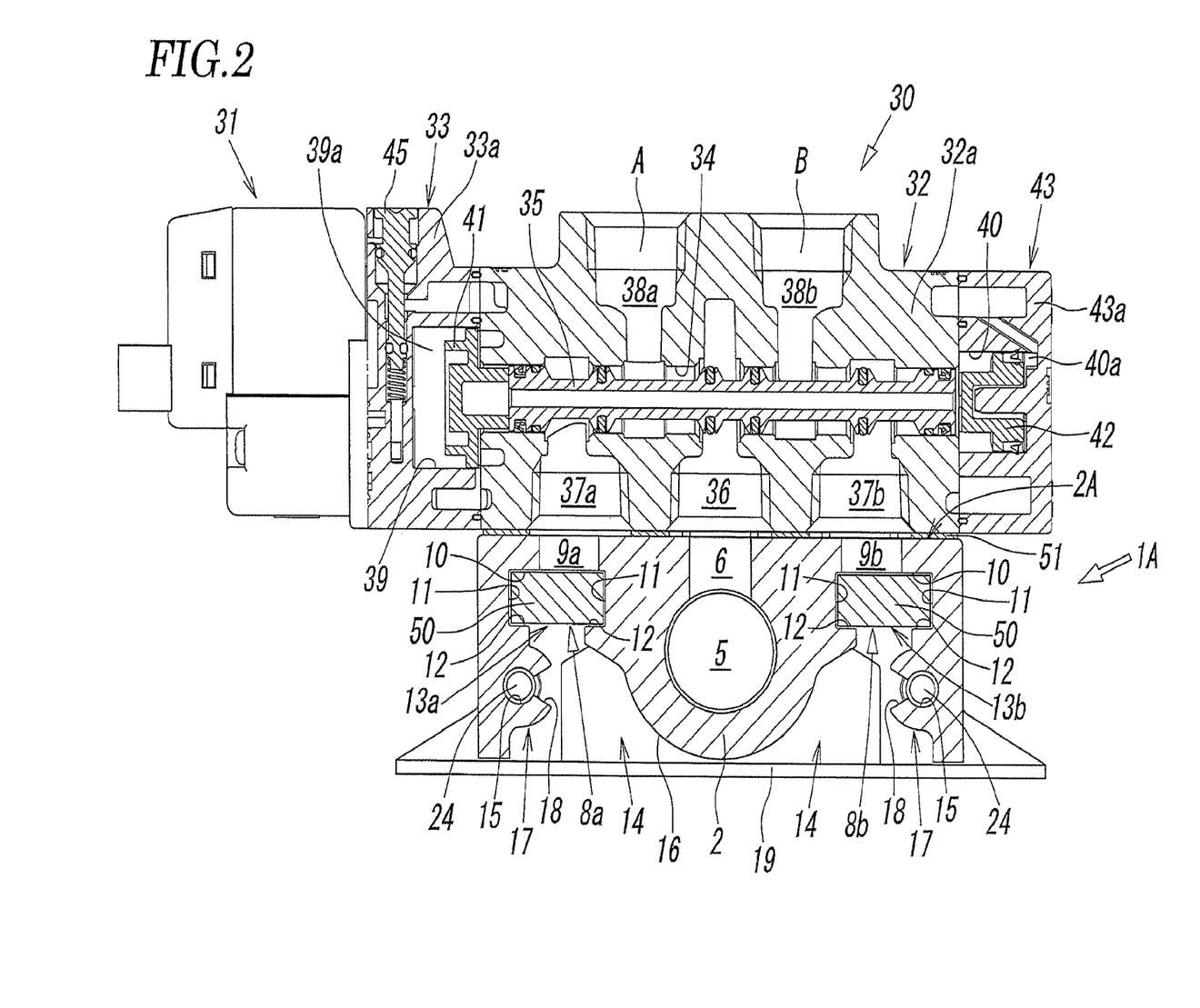
FIG. 2 is a schematic partial sectional view in plan view of FIG. 1.

As shown in FIGS. 1 and 2, the manifold assembly 1A according to the first embodiment is for forming an electromagnetic valve assembly (electromagnetic valve cluster) by mounting and clustering a plurality of electromagnetic valves 30. The manifold assembly 1A includes a manifold block 2 having a valve mounting surface 2A for arranging the electromagnetic valves 30 side by side in the width direction, silencer members 50 mounted in the manifold block 2 and for suppressing the sound of exhaust discharged from the electromagnetic valves 30, and a pair of brackets 19, 19 fixed to both end faces of the manifold block.

As shown in FIGS. 1 and 2, the electromagnetic valves 30 are well-known five-port electromagnetic valves having a pilot valve 31, and have output ports A, B for outputting compressed air supplied from the manifold assembly 1 toward an actuator (not shown). FIG. 1 shows an example in which five electromagnetic valves 30 are mounted on the manifold block 2, but since the electromagnetic valves 30 have the same structure in this case, they will be described with reference to FIG. 2.

As shown in FIG. 2, the electromagnetic valves 30 include a main valve portion 32 having a spool 35 as a main valve body therein and forming a substantially rectangular parallelepiped shape having a substantially rectangular cross-section, first and second adapter portions 33, 43 connected to both end faces in the axial direction (longitudinal direction) of the main valve portion 32, and the pilot valve 31 connected to the first adapter portion 33. The main valve portion 32 has a housing 32a in which a valve hole 34 is formed so as to penetrate in the axial direction, and is constructed by accommodating the spool 35 slidably in the axial direction in the valve hole 34. A supply through hole 36, first and second discharge through holes 37a, 37b, and first and second output through holes 38a, 38b communicate with the valve hole 34. Of these through holes, the supply through hole 36 and the two discharge through holes 37a, 37b open on the bottom surface of the housing 32a corresponding to the joint surface with the valve mounting surface 2A of the manifold block 2. On the other hand, the two output through holes 38a, 38b open on the upper surface of the housing 32a through the two output ports A, B, respectively.

The supply through hole 36 is provided at substantially the center in the axial direction of the housing 32a, and the discharge through holes 37a, 37b are provided on both sides in the axial direction of the supply through hole 36. The first output through hole 38a is provided between the supply through hole 36 and the first discharge through hole 37a in the axial direction, and the second output through hole 38b is provided between the supply through hole 36 and the second discharge through hole 37b, and the connection state of the flow paths between these through holes can be switched by the sliding movement of the spool 35.

The first and second adapter portions 33, 43 have cylinder chambers 39, 40 communicating with the valve hole 34 in the main valve portion 32 side end faces of their bodies 33a, 43a. First and second pistons 41, 42 that come into and out of contact with both axial end faces of the spool 35 are slidably accommodated in the cylinder chambers 39, 40. The cylinder diameter of the first cylinder chamber 39 is larger than the cylinder diameter of the second cylinder chamber 40, and accordingly, the first piston 41 accommodated in the first cylinder chamber 39 is also formed larger in diameter than the second piston 42 accommodated in the second cylinder chamber 40.

The first pressure chamber 39a on the head side of the first piston 41 in the first cylinder chamber 39 (the left-side chamber defined by the first piston 41 in FIG. 2) communicates with the supply through hole 36 through the pilot valve 31. When being ON, the pilot valve 31 connects the first pressure chamber 39a to the supply through hole 36, and when being OFF, opens the first pressure chamber 39a to the atmosphere. On the other hand, the second pressure chamber 40a on the head side of the second piston 42 in the second cylinder chamber 40 (the right-side chamber defined by the second piston 42 in FIG. 2) always communicates with the supply through hole 36. The other chamber on the rod side (spool side) in each cylinder chamber 39, 40 is always opened to the atmosphere.

In the electromagnetic valve 30 configured as described above, pilot air is supplied to and discharged from the first pressure chamber 39a of the large-diameter first piston 41 by turning on and off the pilot valve 31. At that time, the spool 35 is reciprocated in the valve hole 34 by the difference in biasing force acting on the pistons 41, 42 in the axial direction. As a result, the connection state between the through holes 36, 37a, 37b, 38a, 38b is switched. Reference numeral 45 in FIG. 2 denotes an operating device for manual operation, which is for manually producing the connection state of each through hole at the time when the pilot valve 31 is turned on.

Since the structure of such an electromagnetic valve 30 is well known and does not directly relate to the gist of the present invention, further description of its structure will be omitted.

Next, the manifold assembly 1A on which the electromagnetic valves 30 are mounted will be described.

Figure 3:
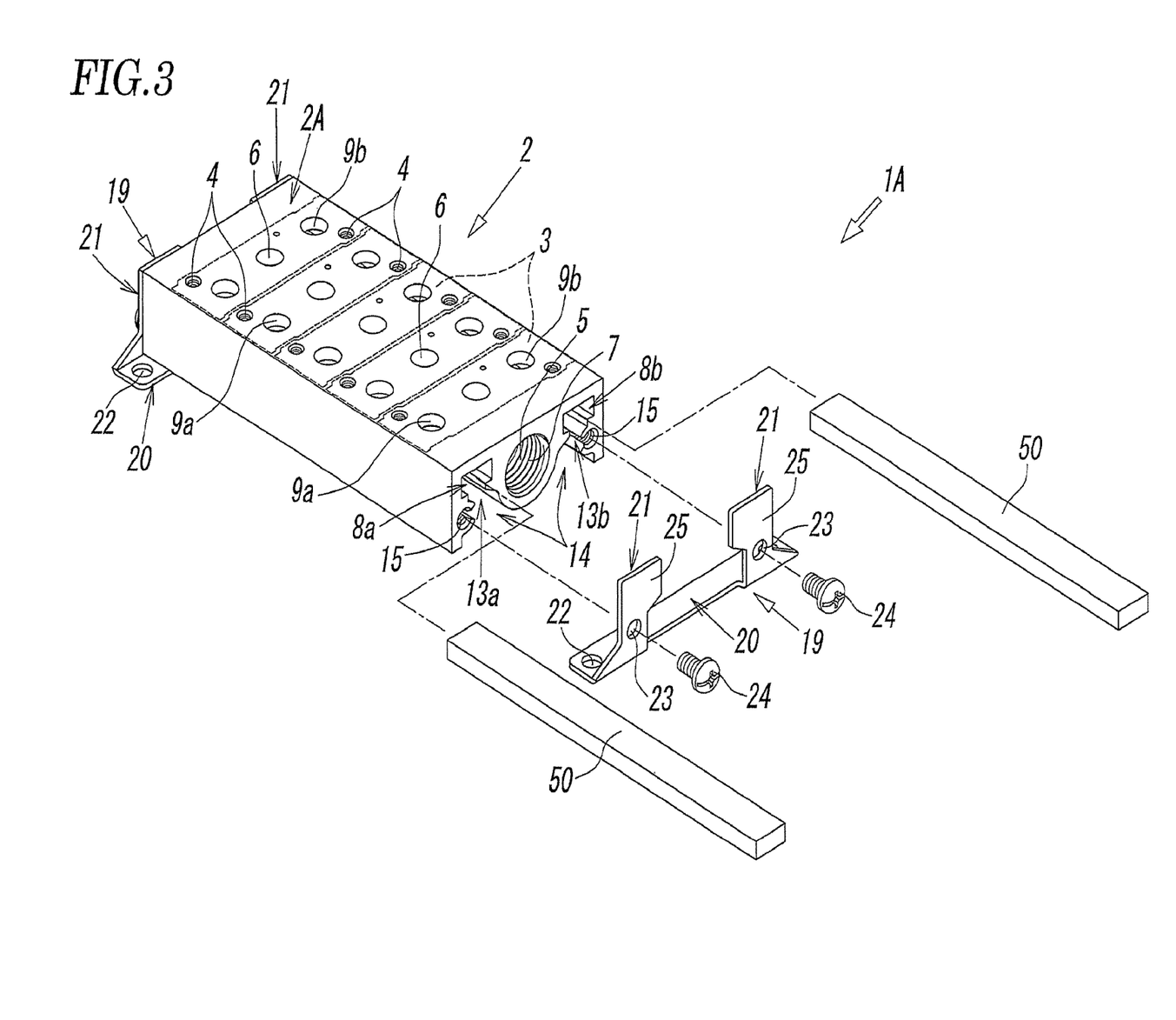
FIG. 3 is an exploded perspective view of the manifold assembly for an electromagnetic valve according to the first embodiment.

As shown in FIG. 1 or 3, the manifold block 2 constituting the manifold assembly 1A is formed of an elongated substantially rectangular parallelepiped block body integrally molded by casting or the like, and its upper surface, which is a flat surface, forms the valve mounting surface 2A for mounting the electromagnetic valves 30. As indicated by broken line (imaginary line) in FIG. 3, the valve mounting surface 2A is provided with a plurality of fixing regions 3 for individually fixing the electromagnetic valves 30, and the fixing regions 3 are arranged side by side along the longitudinal direction of the manifold block 2.

In this embodiment, the valve mounting surface 2A is divided into the fixing regions 3 so that a total of five electromagnetic valves 30 can be arranged side by side in the lateral width direction. Even though the valve mounting surface 2A is divided into the fixing regions 3, the valve mounting surface 2A is not clearly divided by marks such as boundary lines. However, the valve mounting surface 2A can be divided by providing some marks if necessary. In FIG. 3, reference numeral 4 denotes screw holes for screwing the electromagnetic valves 30 to the fixing regions 3, and in the illustrated example, two screw holes 4 are provided in each fixing region 3. That is, in this embodiment, each fixing region 3 is substantially defined by these two screw holes 4. The manifold block 2 is formed such that the length in the lateral direction (width direction) is substantially equal to the axial length of the housing 32a of the electromagnetic valve 30.

As shown in FIGS. 2 and 3, the supply flow paths 5, 6 for supplying compressed air to the electromagnetic valves 30 are formed in the manifold block 2. Specifically, the supply flow paths 5, 6 include a collective air supply path 5 for collectively flowing compressed air to be supplied to the plurality of electromagnetic valves 30, and a plurality of individual supply paths 6 that branch from the collective air supply path 5 and open individually on the fixing regions 3 of the valve mounting surface 2A. The collective air supply path 5 is formed at the center position in the lateral direction (width direction) of the manifold block 2 so as to penetrate between both end faces in the longitudinal direction of the manifold block 2. In this embodiment, both end faces of the manifold block 2 are formed symmetrically with respect to the end openings 7 of the collective air supply path 5. The collective air supply path 5 is formed in a substantially circular cross-sectional shape, and as shown in FIG. 3, a female thread is formed in the inner peripheral wall of each end opening 7. A pipe fitting such as a quick fitting having a male thread formed on the outer periphery can be attached to the end opening 7 by screwing.

Figure 5:
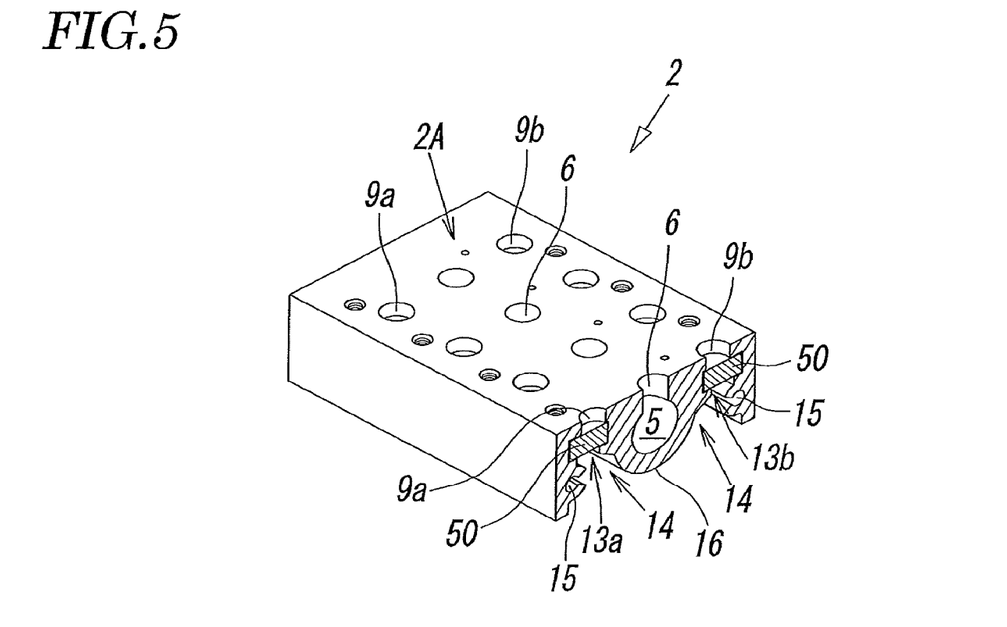
FIG. 5 is a perspective view showing a cross-section in the width direction of the manifold block in FIG. 4.

The individual air supply paths 6 are flow paths for sending compressed air supplied from the collective air supply path 5 to the electromagnetic valves 30, and are formed by linearly penetrating between the inner peripheral wall of the collective air supply path 5 and the valve mounting surface 2A as shown in FIG. 2 or 5. The individual air supply paths 6 have a substantially circular cross section similar to that of the collective air supply path 5, and the bore diameter thereof is smaller than that of the collective air supply path 5. As shown in FIG. 3, in this embodiment, one individual supply path 6 is opened for a single fixed region 3, and a total of five individual supply paths 6 are arranged side by side along the longitudinal direction of the manifold block 2. The individual air supply paths 6 open on the central part of the valve mounting surface 2A in the width direction of the manifold block 2.

The manifold block 2 is provided with first and second attachment grooves 8a, 8b for attaching the silencer members 50, and a plurality of pairs of first and second individual exhaust paths 9a, 9b that are branched from the attachment grooves 8a, 8b and open on the fixing regions 3 of the valve mounting surface 2A. At this time, the first and second attachment grooves 8a, 8b have the same cross-sectional shape and size, and are disposed at positions symmetrical with respect to the collective air supply path 5 in the width direction of the manifold block 2.

As shown in FIGS. 2 and 3, the first and second attachment grooves 8a, 8b are formed to be grooves opening on the bottom surface of the outer peripheral surface of the manifold block 2 and having a substantially rectangular cross-section. The attachment grooves 8a, 8b extend parallel to each other along the arrangement direction of the fixing regions 3 on the valve mounting surface 2A (that is, the longitudinal direction of the manifold block 2) and penetrate between both end faces in the longitudinal direction of the manifold block 2. As shown in FIG. 2, the collective air supply path 5 is located substantially at the center in the height direction (vertical direction in FIG. 2) of the manifold block 2, whereas the attachment grooves 8a, 8b are formed at positions that are near to the valve mounting surface 2A in the vertical direction of the manifold block 2. As shown in FIGS. 2 and 3, below the pair of attachment grooves 8a, 8b, a pair of screw holes 15, 15 are provided that extend in the axial direction of the attachment grooves 8a, 8b and open on both end faces of the manifold block 2, and screws 24 for fixing brackets 19, which will be described later, are screwed into these screw holes 15, 15.

Figure 4:
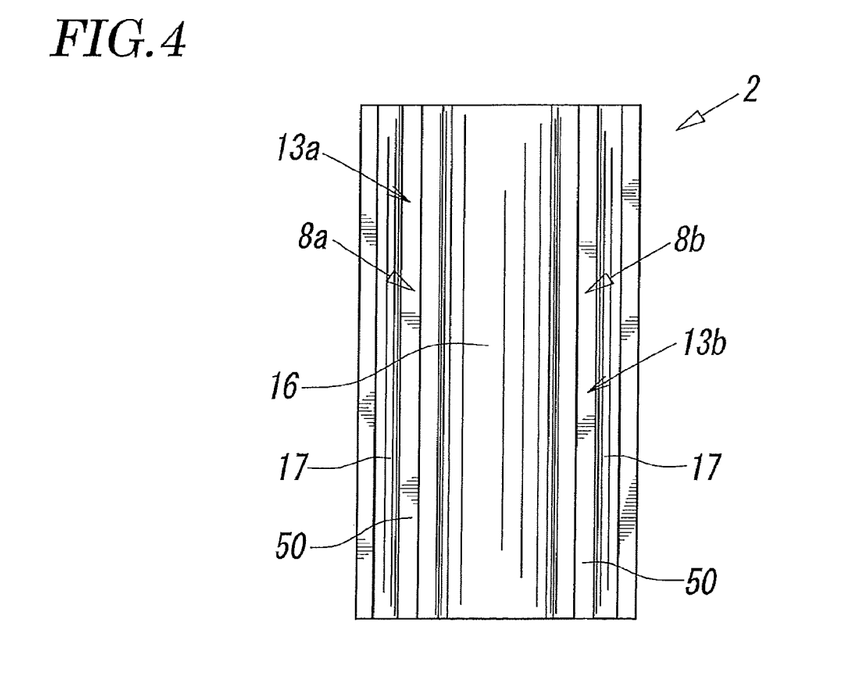
FIG. 4 is a bottom view showing a state in which silencer members are attached to the manifold block.

The specific shape of the attachment grooves 8a, 8b will be described with reference to FIGS. 2 and 3. The attachment grooves 8a, 8b have a bottom wall portion 10 formed to be a flat surface extending along the arrangement direction of the fixing regions 3, a pair of side wall portions 11, 11 erected from the bottom wall portion 10 toward the bottom surface of the manifold block 2, and protruding wall portions 12, 12 protruded from the pair of side wall portions 11, 11 in directions approaching each other. In this embodiment, openings formed between the distal ends of the protruding wall portions 12, 12 form exhaust ports 13*a*, 13*b* for discharging exhaust from the electromagnetic valves 30 to the outside, and as shown in FIG. 4, the exhaust ports 13*a*, 13*b* open over the entire region in the axial direction of the attachment grooves 8*a*, 8*b*.

Thus, owing to the protruding wall portions 12, the width of the exhaust ports 13*a*, 13*b* is smaller than the groove width of the attachment grooves 8*a*, 8*b*, that is, the distance between the pair of side wall portions 11, 11. Therefore, as described later, when the silencer members 50 are accommodated in the attachment grooves 8*a*, 8*b*, the protruding wall portions 12 also serve as support portions for holding the silencer members 50 in the attachment grooves 8*a*, 8*b* (see FIG. 2). Each cross-sectional area of the attachment grooves 8*a*, 8*b* is formed to be smaller than the cross-sectional area of the collective air supply path 5. In the cross-section, the attachment grooves 8*a* and 8*b* are disposed above the center of the collective air supply path 5 (on the side of the valve mounting surface 2A).

Figure 6:
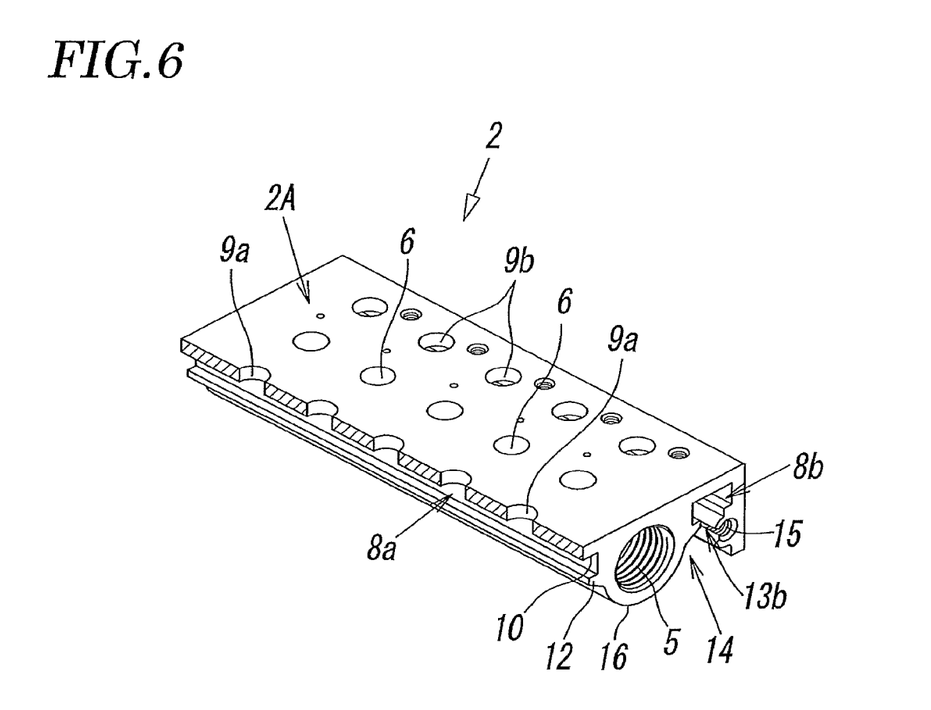
FIG. 6 is a perspective view showing a cross-section in the longitudinal direction (axial direction) of the manifold block.

As shown in FIG. 2 or 6, the first and second individual exhaust paths 9*a*, 9*b* are formed by linearly penetrating between each bottom wall portion 10 of the first and second attachment grooves 8*a*, 8*b* and the valve mounting surface 2A. As shown in FIG. 3, the first and second individual exhaust paths 9*a*, 9*b* open on both sides of the individual air supply path 6 in the width direction of the manifold block 2 in each of the fixing regions 3. That is, all of the first individual exhaust paths 9*a* opened on the fixing regions 3 are always in communication with the first attachment groove 8*a*, and all of the second individual exhaust paths 9*b* opened on the fixing regions 3 are always in communication with the second attachment grooves 8*b*. The bore diameter of the individual exhaust paths 9*a*, 9*b* is formed to be substantially the same as the bore diameter of the individual air supply paths 6, and is smaller than the groove width of the attachment grooves (that is, the distance between the side wall portions 11, 11).

In this embodiment, when the electromagnetic valve 30 is mounted on the valve mounting surface 2A, the first individual exhaust path 9*a* is connected to the first discharge through hole 37*a* formed in the electromagnetic valve 30, and the second individual exhaust path 9*b* is connected to the second discharge through hole 37*b* of the electromagnetic valve 30 (see FIG. 6).

The silencer members 50 accommodated in the attachment grooves 8*a*, 8*b* are integrally formed of a sound-deadening material having air permeability in a stick shape, specifically, an elongated flat plate shape. As shown in FIGS. 2 and 3, the silencer members 50 have a substantially rectangular cross-sectional shape similar to the cross-section of the attachment grooves 8*a*, 8*b*. The vertical and horizontal dimensions of the cross-section thereof are formed to be substantially the same as or slightly smaller than the attachment grooves 8*a*, 8*b* so that they can be inserted through the end face openings of the attachment grooves 8*a*, 8*b*. As the sound-deadening material, for example, an open-cell foam in which air bubbles communicate with each other, or a fiber aggregate formed by entangling fibers with each other is suitably used, but it is not limited thereto.

As shown in FIG. 3, the silencer members 50 are formed such that the axial (longitudinal) length thereof is substantially equal to the axial length of the attachment grooves 8*a*, 8*b*, and the end faces positioned on both sides in the longitudinal direction of the silencer members 50 and the end faces positioned on both sides in the longitudinal direction of the manifold block 2 are flush with each other in a state where the silencer members 50 are accommodated in the attachment grooves 8*a*, 8*b*. Accordingly, in a state in which the silencer members 50 are attached to the manifold block 2, as shown in the partial cross-sectional view of FIG. 5, the sound-deadening material forming the silencer members 50 is disposed at all of the junctions of the individual exhaust paths 9*a*, 9*b* communicating respectively with the attachment grooves 8*a*, 8*b*. That is, in this embodiment, the individual exhaust paths 9*a*, 9*b* are always in communication with the exhaust ports 13*a*, 13*b* opening toward the bottom surface of the manifold block 2 through the sound-deadening material of the silencer members 50, 50 accommodated in the attachment grooves 8*a*, 8*a*.

As shown in FIGS. 2 and 3, in the bottom surface of the manifold block 2, a pair of left and right lightening grooves 14, 14 are formed along the attachment grooves 8*a*, 8*b*. The lightening grooves 14, 14 are formed to penetrate between both end faces in the longitudinal direction of the manifold block 2. At this time, the lightening grooves 14, 14 are formed leaving the portion including the collective air supply path 5 and the pair of screw holes 15, 15 in the height direction of the manifold block 2, and the pair of exhaust ports 13*a*, 13*b* open on the groove walls of the lightening grooves 14, 14. That is, through these lightening grooves 14, 14, the exhaust from the exhaust ports 13*a*, 13*b* can be guided in the axial direction, and can be discharged from both end faces of the manifold block 2 to the atmosphere. In addition, the weight of the manifold block 2 can be reduced, and the manufacturing cost thereof can also be suppressed.

As a result of providing such lightening grooves 14, 14, as shown in FIGS. 2 to 6, in the central part in the width direction on the bottom surface side of the manifold block 2, a central bottom portion 16 having a circular arcuate surface concentric with the opening of the collective air supply path 5 is formed. As shown in FIG. 2, arcuate wall portions 17, 17 surrounding the central axes of the screw holes 15, 15 are formed on both left and right sides in the width direction, and the arcuate wall portions 17, 17 are divided in the circumferential direction by fan-shaped cutouts 18 extending along the central axes of the screw holes 15, 15.

As shown in FIGS. 1 to 3, a pair of brackets 19, 19 are fixed to both end faces of the manifold block 2 having the above-described configuration. These brackets 19, 19 are for stably installing the manifold block 2 at a predetermined position, and are integrally formed of a hard material such as a metal plate or a resin plate. The bracket 19 has an elongated leg plate 20 for fixing to the installation place of the manifold block 2, and a pair of plate-like erected pieces 21, 21 that are erected substantially vertically from the end edge extending in the longitudinal direction of the leg plate 20 and fixed to the end face of the manifold block 2.

The leg plate 20 is bent inward from the lower end edges of the pair of erected pieces 21 and 21 along the bottom surface of the manifold block 2, and extends along the width direction of the manifold block 2. The leg plate 20 is formed to be longer than the length in the width direction of the manifold block 2, so that both longitudinal ends of the leg plate 20 protrude outward from the side surfaces at both ends in the width direction of the manifold block 2. At both ends of the leg plate 20, fixing holes 22, 22 penetrating in the plate thickness direction are provided, and attaching members such as screws are inserted through the fixing holes 22.

On the other hand, the erected pieces 21, 21 have bilaterally symmetrical shapes, and fixing holes 23 used for fixing to the manifold block 2 are formed at approximately the center position in the height direction (erecting direction). With the fixing holes 23 and the screw holes 15 of the manifold block 2 aligned with each other, fixing screws 24 are inserted from the outside into the fixing holes 23 and screwed into the screw holes 15, and the brackets 19, 19 are thereby detachably fixed to the manifold block 2 (see FIG. 1).

The pair of erected pieces 21, 21 have, at the distal ends in the height direction thereof, covering portions 25, 25 that protrude inwardly so as to approach each other in the width direction of the manifold block 2. As shown in FIG. 1, the entire end openings of the attachment grooves 8a, 8b opening on the end faces of the manifold block 2 are covered by these covering portions 25, 25. Therefore, the silencer members 50, 50 are reliably held in the attachment grooves 8a, 8b, and it is possible to prevent the silencer members 50, 50 from being removed from the attachment grooves 8a, 8b regardless of the inclination of the installation location of the manifold block 2. The pair of erected pieces 21, 21 are arranged at a certain distance from each other in the width direction of the manifold block 2 so as not to cover the entire end opening of the collective air supply path 5 and at least a part of the end openings of the lightening grooves 14, 14. The outer peripheral end faces of the covering portions 25, 25 are formed so as to be flush with the valve mounting surface 2A and both side surfaces of the manifold block 2.

The overall configuration of the manifold assembly 1 for an electromagnetic valve having the above-described configuration when the electromagnetic valves 30 are mounted on the manifold block 2 will be described. In FIG. 1, the electromagnetic valves 30 are respectively mounted on all of the fixing regions 3 on the valve mounting surface 2A, but since, as described above, these electromagnetic valves 30 have substantially the same configuration, here, a case where a single electromagnetic valve 30 is operated will be described. Depending on the number of actuators to be controlled, there is a possibility that the electromagnetic valves 30 are not mounted on some of the fixing regions 3. In such a case, the ports of the individual air supply paths 6 and the individual exhaust paths 9a, 9b that open on the fixing regions 3 where the electromagnetic valves 30 are not mounted may be hermetically covered with sealing members such as plugs or plates.

When the manifold assembly 1 for an electromagnetic valve is used, first, the electromagnetic valves 30 are mounted on the valve mounting surface 2A on the upper surface of the manifold block 2 with a sealing member 51 such as a gasket interposed therebetween. In this mounting state, the individual supply paths 6 of the manifold block 2 communicate with the supply through holes 36 of the electromagnetic valves 30, and the first and second individual exhaust paths 9a, 9b of the manifold block 2 respectively communicate with the first and second discharge through holes 37a, 37b of the electromagnetic valves 30. Then, the leg plates 20, 20 of the brackets 19 are disposed at the installation location, and in that state, fixing members such as bolts are inserted into the fixing holes 22, 22 provided at both ends of the leg plates 20, 20, and the manifold assembly 1 is fixed at the installation location with the fixing members. The output ports A, B of the electromagnetic valves 30 are connected to pressure chambers of pneumatic actuators such as double-acting cylinders (not shown), for example. Compressed air is supplied to the collective air supply path 5 of the manifold block 2 from a pneumatic source (not shown).

In the energized state of the pilot valve 31, pilot air supplied from a pilot supply flow path (not shown) is supplied to the first pressure chamber 39a of the first cylinder chamber 39 through the flow path in the pilot valve 31, and the pressure thereof acts on the first piston 41. Then, owing to a difference in biasing force clue to air pressure acting on the large-diameter first piston 41 disposed in the first cylinder chamber 39 and the small-diameter second piston 42 disposed in the second cylinder chamber 40, the spool 35 moves from the second switching position on the side of the first adapter 33 to the first switching position on the side of the second adapter 43 shown in FIG. 2. In this first switching position, the supply through hole 36 and the first output through hole 38a are connected, and the second output through hole 38b and the second discharge through hole 37b are connected.

In such a connection state between the through holes at the first switching position, the compressed air supplied to the supply through hole 36 of the electromagnetic valve 30 through the individual supply path 6 branched from the collective supply path 5 passes through the first through hole 38a and is output from the first output port A. On the other hand, the compressed air from the second output port B, that is, the exhaust from the actuator passes through the second output through hole 38b and the second discharge through hole 37b provided in the electromagnetic valve 30 and the second individual exhaust path 9b of the manifold block 2, and is discharged from the exhaust port 13b to the atmosphere. At this time, the exhaust sent to the second individual exhaust path 9b flows into the second attachment groove 8b communicating with the second individual exhaust path 9b, is silenced (subjected to sound absorption) by the silencer member 50 including sound-deadening material accommodated in the second attachment groove 8b, and is then discharged to the atmosphere through the exhaust port 13b.

In the non-energized state of the pilot valve 31, the supply of the pilot air to the first pressure chamber 39 by the pilot valve 31 is blocked, and the pilot air in the first pressure chamber 39a is discharged to the atmosphere through the flow path in the pilot valve 31. Accordingly, the spool 35 is moved to the second switching position by the urging force of the air pressure constantly acting on the second piston 42. In this second switching position, the supply through hole 36 and the second output through hole 38b in the electromagnetic valve 30 communicate with each other, and the first output through hole 38a and the first discharge through hole 37a are connected.

In such a connection state between the through holes at the second switching position, the compressed air supplied to the supply through hole 36 passes through the second through hole 38b and is output from the second output port B. On the other hand, the compressed air from the first output port A, that is, the exhaust from the actuator passes through the first output through hole 38a and the first discharge through hole 37a of the electromagnetic valve 30 and the first individual exhaust path 9a of the manifold block 2, and is discharged from the exhaust port 13b to the atmosphere. At this time, the exhaust sent to the first individual exhaust path 9a flows into the first attachment groove 8a communicating with the first individual exhaust path 9a, is silenced (subjected to sound absorption) by the silencer member 50 accommodated in the first attachment groove 8a, and is then discharged to the atmosphere through the exhaust port 13b.

Thus, in this embodiment, a configuration is adopted in which the first and second individual exhaust paths 9a, 9b leading to the fixing regions 3 for the electromagnetic valves 30 are branched from the first and second attachment grooves 8a, 8b to which the silencer members 50 are attached, and the silencer members 50 are incorporated in the manifold block 2. For this reason, there is no need to provide a collective exhaust flow path unlike the conventional art, so that it is possible to more rationally design the manifold block 2, for example, by reducing the size and weight of the manifold block. Further, since the exhaust ports 13a, 13b are formed in the lightening grooves 14, 14 formed in the bottom surface of the manifold block 2, the exhaust sound can be further reduced.

FIGS. 7 to 11 show a manifold assembly 1B for an electromagnetic valve according to a second embodiment of the present invention. The main difference between the manifold assembly 1B according to the second embodiment and the manifold assembly 1A according to the first embodiment is that instead of attaching the brackets 19, 19 to the manifold block 2, leaf spring-like elastic members 60 having spring elasticity are attached to the lightening grooves 14. So, the same reference numerals as those of the manifold assembly 1A of the first embodiment are attached to the same main constituent parts of both, and the explanation of those constituent parts and the operation effect based on those constituent parts is omitted for avoiding redundant description.

Figure 9:
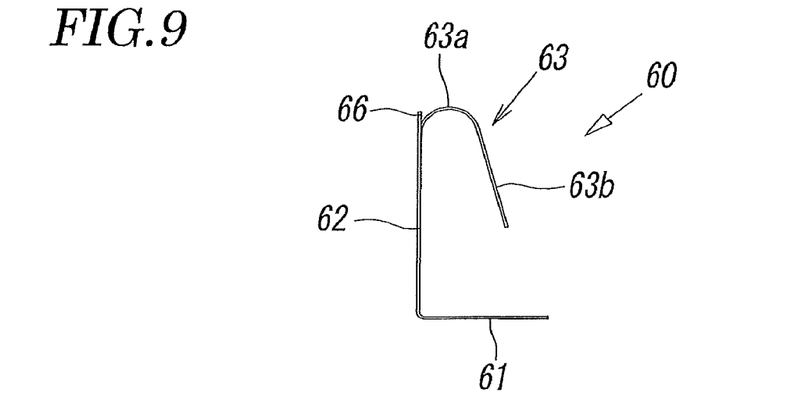
FIG. 9 is a side view showing an elastic member to be attached to the manifold block.
Figure 10:
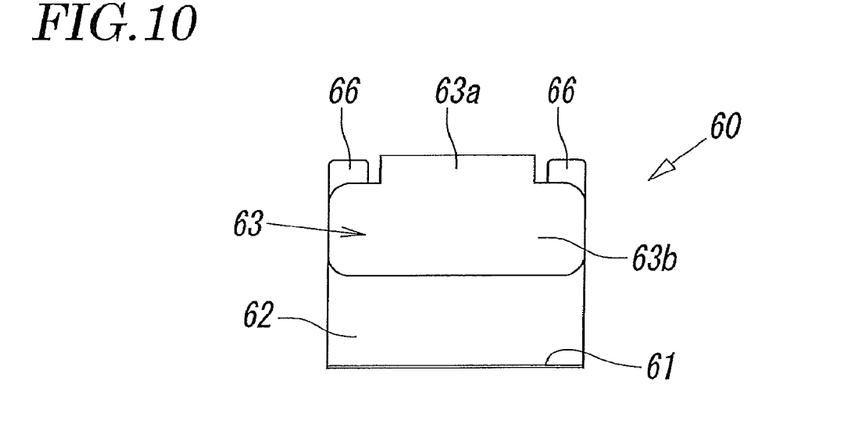
FIG. 10 is a front view of FIG. 9.
Figure 11:
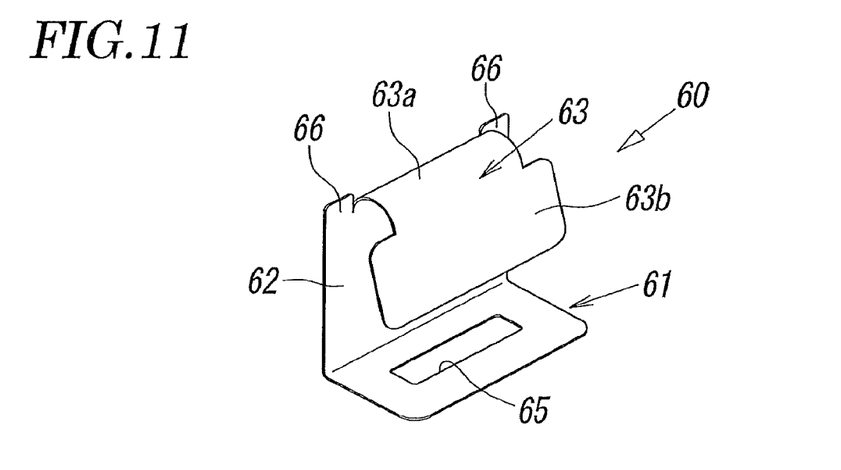
FIG. 11 is a perspective view of FIG. 9.

As can be seen from FIGS. 9 to 11, the elastic member 60 includes a base portion 61 having a substantially flat plate shape, an erected portion 62 erected in a substantially orthogonal direction from the side edge of the base portion 61, and the spring portion 63 that is inverted from the distal end of the erected portion 62 toward the base portion 61 and curved in a substantially arc shape. The elastic member 60 is integrally formed of a thin plate made of a metal material such as stainless steel.

As shown in FIG. 11, a substantially rectangular hole 65 penetrating in the plate thickness direction is formed in the base portion 61. The hole 65 is used, for example, when removing the elastic member 60 attached to the manifold block 2. Specifically, by hooking the tip of a tool or the like on the edge of the hole 65 and pulling it outward (in the direction of the bottom surface shown in FIG. 7), the elastic member 60 locked in the attachment groove 8a, 8b can be easily removed. The erected portion 62 is formed in a substantially flat plate shape having the same width as that of the base portion 61. At both ends of the distal end of the erected portion 62, a pair of protruding pieces 66, 66 extending in the erecting direction of the erected portion 62 so as to be flush with the erected portion 62 are formed.

On the other hand, the spring portion 63 is formed by curving and bending the intermediate portion between the pair of protruding pieces 66, 66 at the distal end of the erected portion 62 toward the base portion 61, and includes a curved portion 63a located between the protruding pieces 66, 66 and a flat straight portion 63b formed wider than the curved portion 63a. The curved portion 63a has a convex shape having a top portion on the side opposite to the base portion 61, and the straight portion 63b is inclined in a direction away from the erected portion 62 toward the distal end thereof. Thus, the spring portion 63 can bend around the curved portion 63a in a direction in which the spring portion 63 comes into and out of contact with the erected portion 62.

Figure 8:
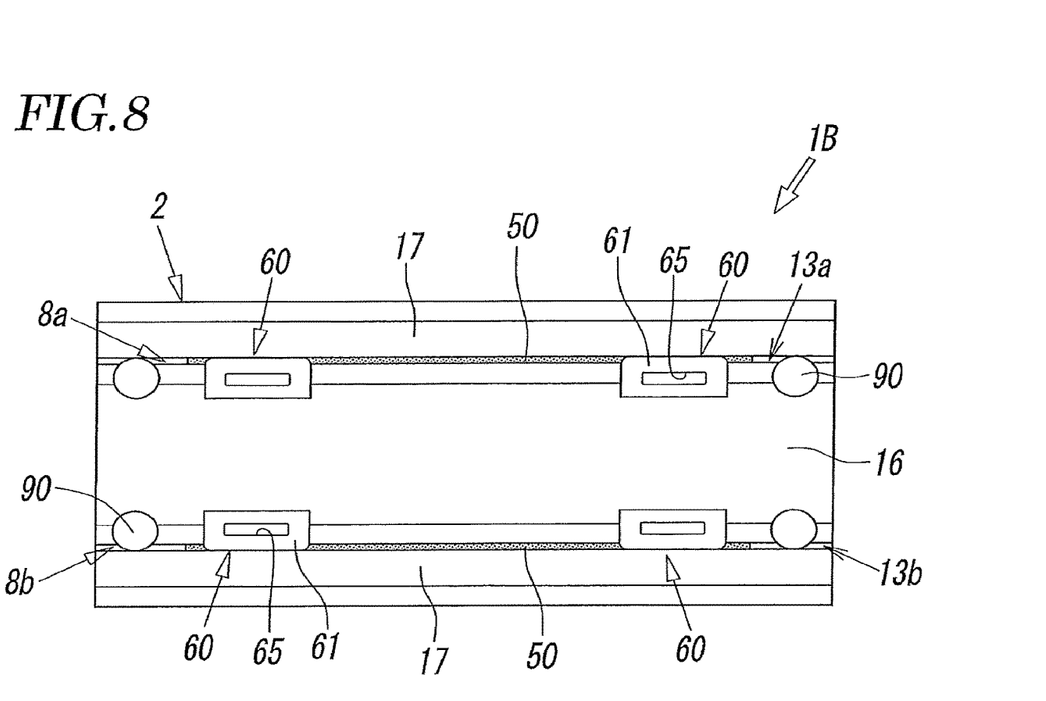
FIG. 8 is a bottom view of FIG. 7.

In addition, in this manifold assembly 1B, attachment holes 90 penetrating the valve mounting surface 2A and the bottom surface are formed in the vicinity of both end faces in the longitudinal direction of the manifold block 2 (see FIG. 8). The attachment holes 90 are for inserting attaching members such as screws and fixing the manifold block 2 to a predetermined installation place. In this embodiment, two attachment holes 90 are provided along each attachment groove 8a, 8b (a total of four attachment holes are provided) so as to be spaced apart from each other by a predetermined distance.

So, the longitudinal length of the silencer member 50 in the second embodiment is formed shorter than the longitudinal length of the manifold block 2, and specifically, it is formed shorter than the distance between the two attachment holes 90, 90 in the longitudinal direction of the manifold block 2. The silencer member 50 is disposed between the two attachment holes 90, 90 in the first and second attachment grooves 8a, 8b, and the silencer member 50 is thereby located at all of the junctions of the individual exhaust paths 9a, 9b and the first and second attachment grooves 8a, 8b.

Next, a procedure of holding the silencer member 50 in each attachment groove 8a, 8b with the elastic member 60 will be specifically described.

First, the silencer members 50 are accommodated in the first and second attachment grooves 8a, 8b, and the elastic members 60 are disposed on the bottom surface side of the manifold block 2. At this time, the elastic members 60 are in a posture in which the spring portion 63 faces upward (the upper side in FIG. 7), and the straight portion 63b of the spring portion 63 and the arcuate wall portion 17 of the manifold block 2 face each other. Then, the elastic member 60 is pushed toward the exhaust port 13a, 13b in the attachment groove 8a, 8b through the space between the arcuate wall portion 17 and the central bottom portion 16, that is, through the lightening groove 14.

Figure 7:
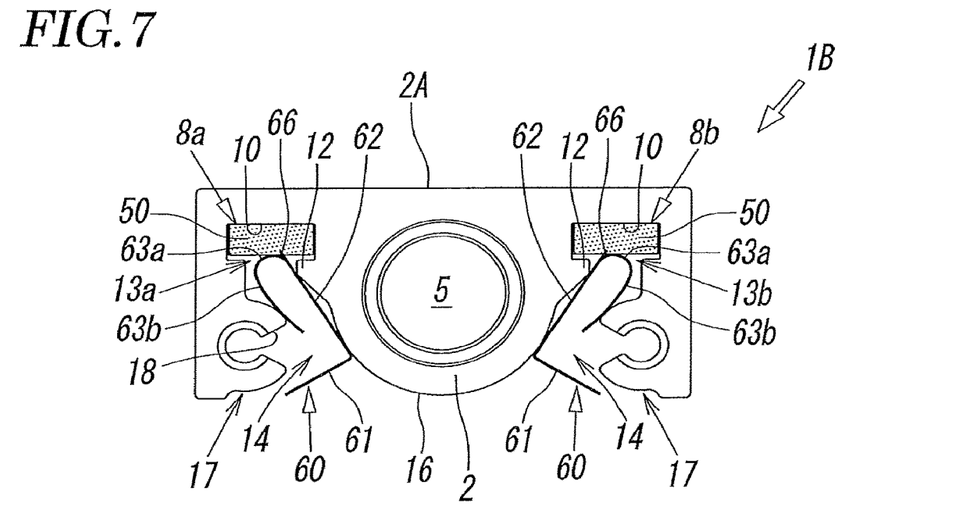
FIG. 7 is a plan view schematically showing a manifold assembly for an electromagnetic valve according to a second embodiment of the present invention.

Then, the straight portion 63b of the spring portion 63 comes into contact with the arcuate wall portion 17 (more specifically, the upper wall surface sandwiching the cutout 18 in FIG. 7), the spring portion 63 is pressed toward the erected portion 62 and is bent, and the elastic member 60 is thereby elastically press-fitted between the arcuate wall portion 17 and the protruding wall portion 12 and the central wall portion 16 of the manifold block 2. As a result, the elastic member 60 is attached in the lightening groove 14 in a state where, by the elastic force of the bent and elastically deformed spring portion 63, the straight portion 63b of the spring portion 63 is pressed against the arcuate wall portion 17 and the erected portion 62 is pressed against the protruding wall portion 12 and the central wall portion 16.

At that time, a part of the elastic member 60 (the curved portion 63a at the distal end) is disposed in the attachment groove through the exhaust port, and thereby the elastic member 60 comes into contact with the silencer member 50 and presses the silencer member 50 against the bottom wall portion 10 of the attachment groove 8a, 8b. Specifically, the pair of protruding pieces 66, 66 of the elastic member 60 pierce or strongly abut on the silencer member 50 made of fiber aggregate, and thereby the silencer member 50 is restrained from moving and held in the attachment groove 8a, 8b.

FIGS. 7 and 8 show an example in which two elastic members 60, 60 are attached to each of the first attachment groove 8a and the second attachment groove 8b, but the present invention is not limited to this, and the number of elastic members 60 to be attached to each attachment groove 8a, 8b may be one, or three or more. Alternatively, different numbers of elastic members 60 may be attached to the first attachment groove 8a and the second attachment groove 8b. The interval at which the elastic members 60 are attached can also be appropriately set.

Figure 12:
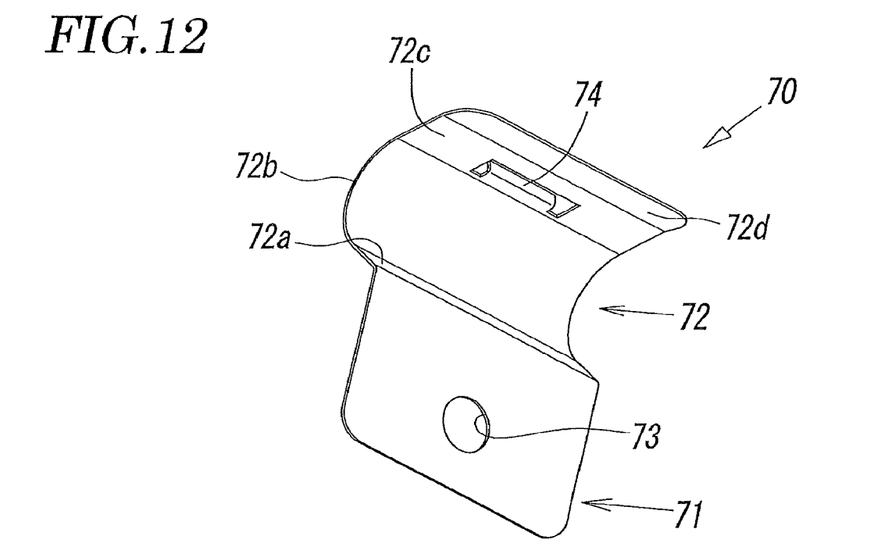
FIG. 12 is a perspective view showing a modified example of the elastic member.

FIG. 12 shows a modified example of the elastic member. The elastic member 70 according to this modified example is also integrally formed of a thin plate made of a metal material and is composed of a base portion 71 having a substantially flat plate shape and a substantially arcuate spring portion 72 continuous with the base portion 71. A substantially circular hole 73 penetrating in the plate thickness direction is formed in the base portion 71. As with the hole 65 formed in the elastic member 60 in the second embodiment, the hole 73 is for facilitating the detachment of the elastic member 70 attached to the manifold block 2.

On the other hand, the spring portion 72 includes a flat first planar portion 72a bent from the end edge of the base portion 71 to form an obtuse angle with respect to the base portion 71, a curved portion 72b that is continuous with the first planar portion 72a and is curved convexly in a direction substantially orthogonal to the base portion 71, a flat second planar portion 72c smoothly continuing to the distal edge of the curved portion 72b, and a distal end portion 72d that is bent from the end edge of the second planar portion 72c to form an obtuse angle with respect to the second planar portion 72c and is inclined toward the base portion 71 side. In the elastic member 70 of this modified example, the second planar portion 72c and the distal end portion 72d can bend around the curved portion 72b of the spring portion 72 in a direction in which the second planar portion 72c and the distal end portion 72d come into and out of contact with the first planar portion 72a.

The second planar portion 72c of the elastic member 70 is provided with a substantially L-shaped protruding piece 74 erected substantially perpendicularly outward from the plate surface of the second planar portion 72c. This protruding piece 74 is formed by cutting and erecting the plate surface of the second planar portion 72c, and, similarly to the protruding pieces 66 of the elastic member 60 according to the second embodiment, pierces or strongly abuts on the silencer member 50, thereby preventing the movement of the silencer member 50 in the attachment groove 8a, 8b.

Next, a procedure of holding the silencer member 50 in each attachment groove 8a, 8b with the elastic member 70 of this modified example will be described.

Figure 15:
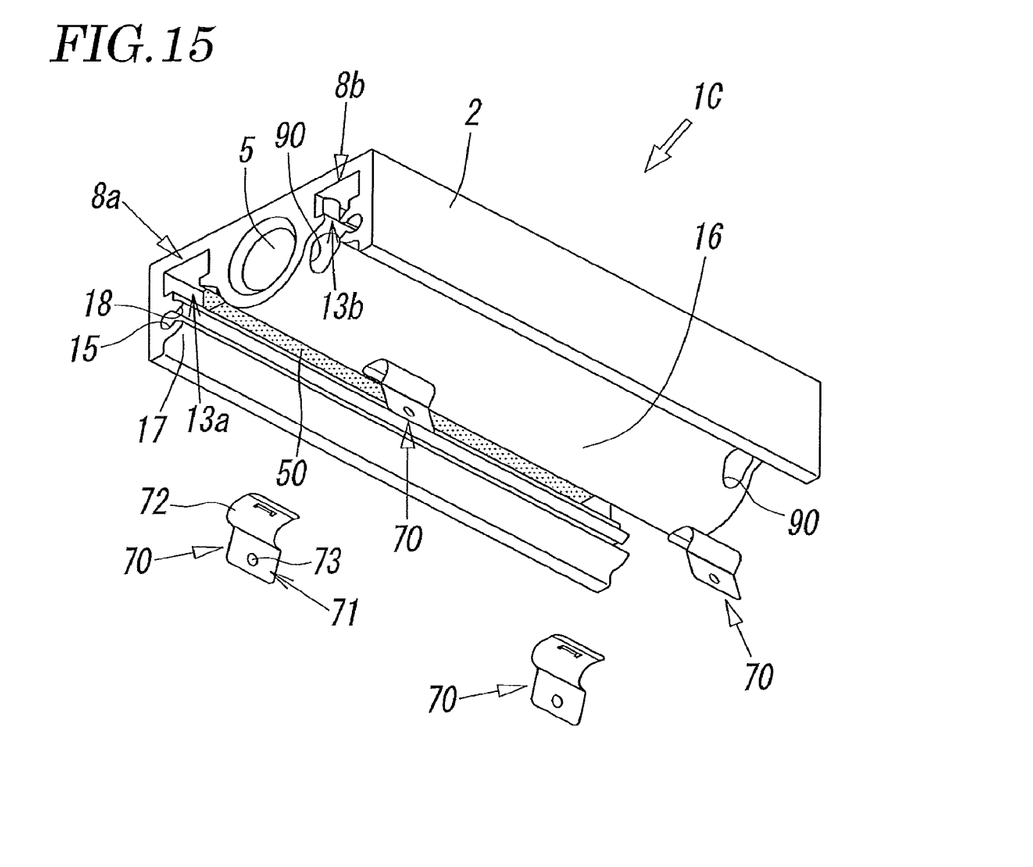
FIG. 15 is a perspective view showing a state before the elastic member in FIG. 12 is attached to the manifold block.

First, the silencer member 50 is accommodated in the first and second attachment grooves 8a, 8b, and the elastic members 70 are disposed on the bottom surface side of the manifold block 2 as shown in FIG. 15. At this time, the elastic members 70 are in a posture in which the spring portion 72 faces upward, and the convex side of the curved spring portion 72 and the arcuate wall portion 17 of the manifold block 2 face each other.

Figure 13:
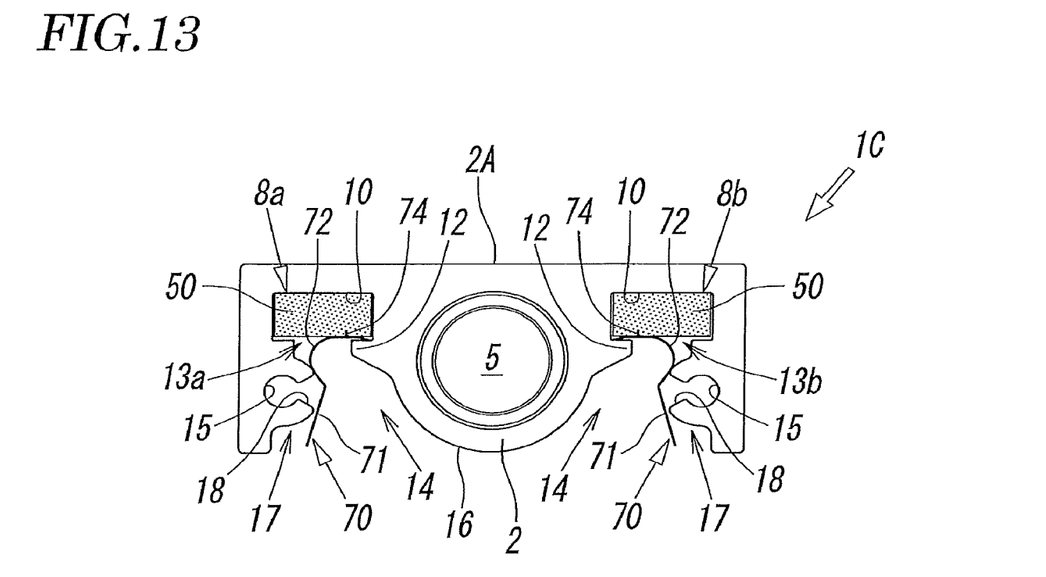
FIG. 13 is a side view showing a state where the elastic member of FIG. 12 is attached to the manifold block.
Figure 14:
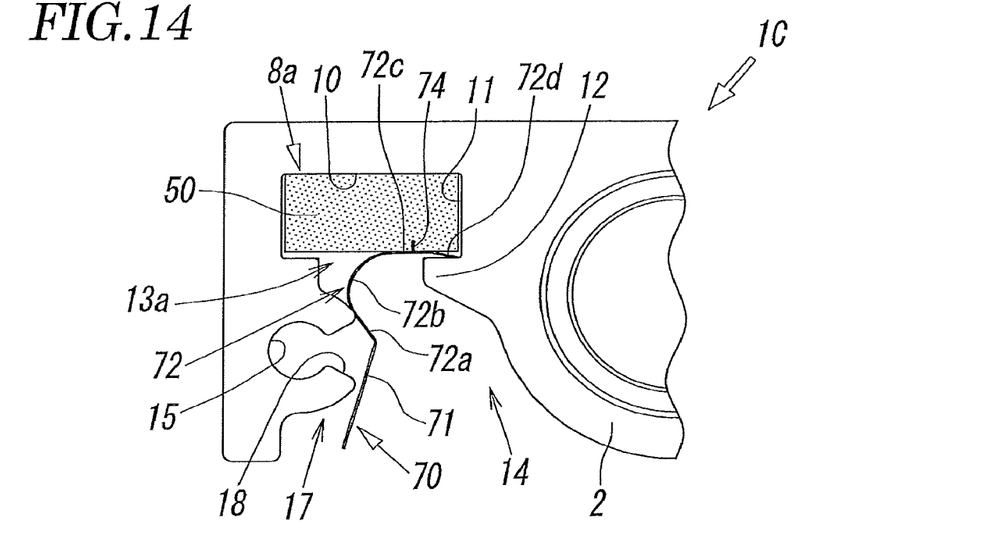
FIG. 14 is an enlarged side view schematically showing a main part around the attachment groove in FIG. 12.

Then, as shown in FIG. 14, the distal end portion 72d of the spring portion 72 is inserted between the bottom surface of the silencer member 50 and the protruding wall portion 12 of the attachment groove 8a, 8b through the exhaust port 13a, 13b, and is brought into contact with an inner corner portion where the protruding wall portion 12 and the side wall portion 11 of the attachment groove 8a, 8b intersect (see FIG. 14). Then, in that state, the spring portion 72 is further inserted in the depth direction of the lightening portion 14, that is, to the exhaust port 13a, 13b side, and in a state in which the spring portion 72 is bent, it is brought into contact with the arcuate wall portion 17 (more specifically, the upper wall surface sandwiching the cutout 18 in FIGS. 13 and 14).

Then, by the elastic force of the bent and elastically deformed spring portion 72 of the elastic member 70, the elastic member 70 is elastically held between the corner portion where the protruding wall portion 12 and the side wall portion 11 intersect and the arcuate wall portion 17 of the lightening portion 14. At the same time, by the elastic force of the spring portion 72, the second straight portion 72c of the elastic member 70 is brought into pressure contact with the bottom surface of the silencer member 50, and the silencer member 50 is pressed against the bottom wall portion 10 of the attachment groove 8a, 8b. At this time, the protruding piece 74 of the elastic member 70 pierces or strongly abuts on the silencer member 50, and movement of the silencer member 50 in the attachment groove 8a, 8b is more reliably prevented. In this manner, a manifold assembly 1C for an electromagnetic valve to which the elastic member 70 of the modified example is attached is configured (see FIGS. 13 and 14).

Figure 16:
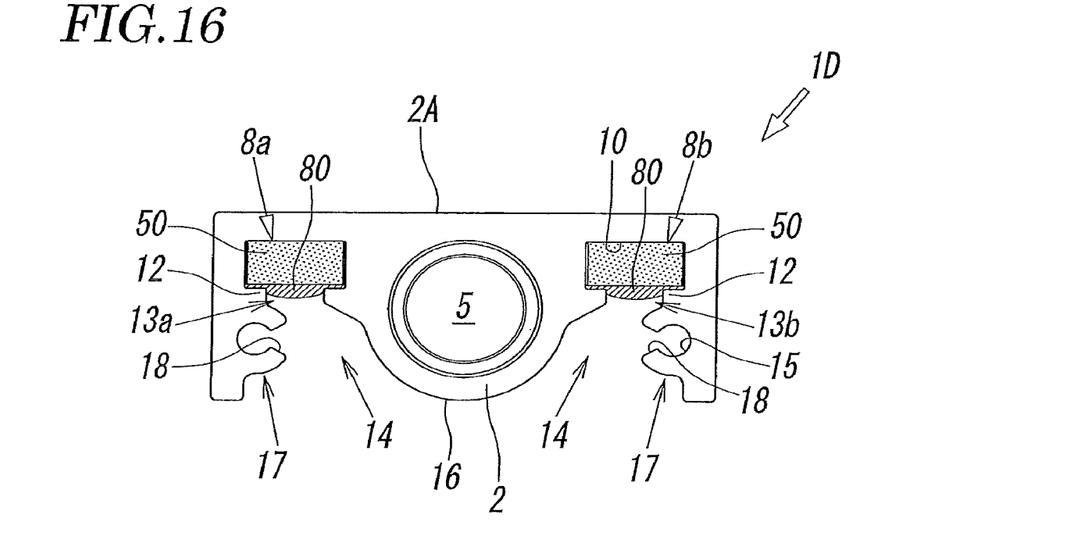
FIG. 16 is a side view schematically showing a manifold assembly for an electromagnetic valve according to a third embodiment of the present invention.
Figure 17:
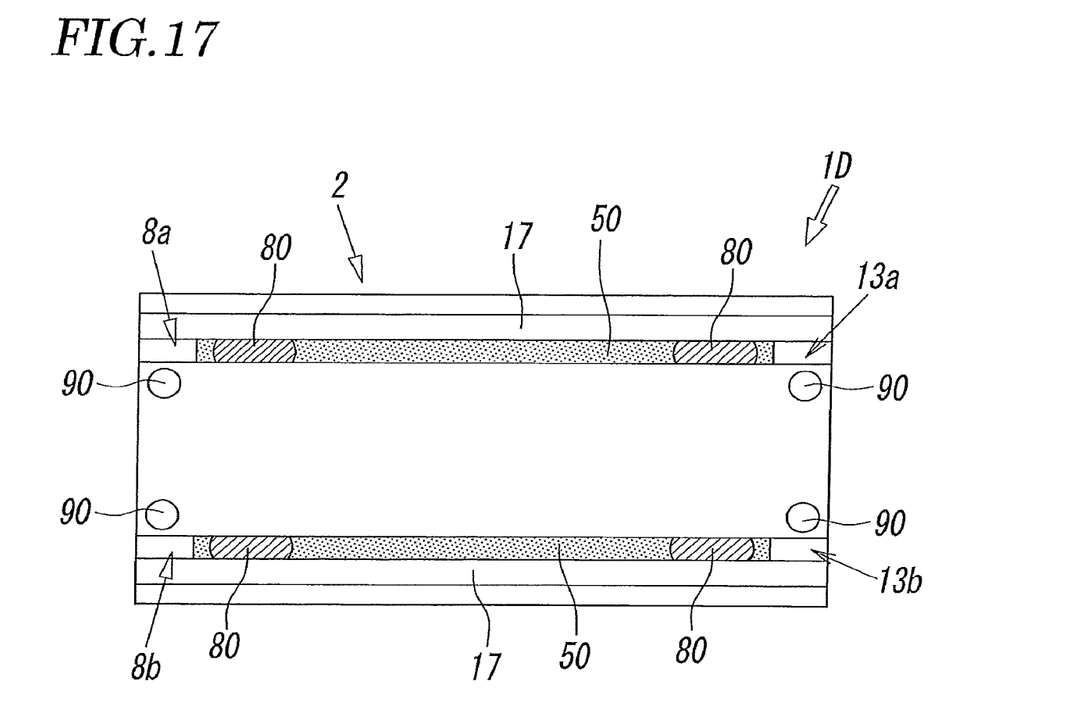
FIG. 17 is a bottom view of FIG. 16.

FIGS. 16 and 17 show a manifold assembly 1D for an electromagnetic valve according to a third embodiment of the present invention. In the manifold assembly 1D for an electromagnetic valve of this embodiment, the silencer member 50 is held in the attachment groove 8a, 8b by using an adhesive. Specifically, firstly, as described in the previous embodiment, the silencer members 50 are inserted into the first and second attachment grooves 8a, 8b. In that state, adhesive 80 is introduced between the inner walls of the attachment grooves 8a, 8b and the outer peripheral surfaces of the silencer members 50 from the exhaust port 13a, 13b side in the attachment grooves 8a, 8b.

By doing so, the silencer members 50 are fixed to the groove walls of the attachment grooves 8a, 8b (the bottom surfaces of the silencer members 50 and the wall surfaces of the protruding wall portions 12 of the attachment grooves 8a, 8a in the example of FIG. 16) by the cured adhesive 80, and the silencer members 50 can be held in the attachment grooves 8a, 8b in a state where the movement thereof is restrained. At this time, as shown in FIGS. 16 and 17, when the bridges of adhesive extending in the entire width direction of the exhaust ports 13a, 13b are formed so as to connect the opposed protruding wall portions 12, 12, the silencer members 50 can be more reliably held in the attachment grooves 8a, 8b. The kind of the adhesive is not particularly limited, and any adhesive may be used as long as the silencer members 50 can be held in the attachment grooves 8a, 8b.

In the third embodiment, as shown in FIG. 17, the silencer member 50 is bonded to one attachment groove at two locations, but the present invention is not limited to this, and it may be bonded at one location or may be bonded at a plurality of locations.

Although the manifold assembly for an electromagnetic valve according to the present invention has been described in detail above, it goes without saying that the present invention is not limited to the above-described embodiments, and various design changes may be made without departing from the spirit of the claims.

For example, in the example described in the first embodiment, single pilot type electromagnetic valves 30 having a single pilot valve 31 are mounted on the valve mounting surface 2A of the manifold block, but double-pilot type electromagnetic valves having two pilot valves may be mounted. In each of the embodiments, the cross-section of the attachment grooves 8a, 8b is formed in a substantially rectangular shape, but there is no necessity to do so. For example, the attachment grooves 8a, 8b may have another shape such as a circular shape or an elliptical shape. In this case, the silencer member 50 may be formed in accordance with the cross-sectional shape thereof.

Although the entire silencer member 50 is integrally formed of a sound-deadening material, it may be formed such that the sound-deadening material is disposed at least at the junctions between the individual exhaust paths 9a, 9b and the attachment grooves 8a, 8b. For example, it may be formed by a combination of a sound-deadening material and another material. The protruding wall portions 12 of the attachment grooves 8a, 8b forming the exhaust ports 13a, 13b are formed over the entire area of the attachment grooves, but if the silencer members 50 can be held in the grooves, they can also be partially provided along the axial direction.

REFERENCE SIGNS LIST 1A, 1B, 1C, 1D manifold assembly
2 manifold block
2A valve mounting surface
3 fixing region
5 collective air supply path
6 individual air supply path
8a, 8b attachment groove
9a, 9b individual exhaust path
30 electromagnetic valve
50 silencer member
60, 70 elastic member
80 adhesive

The invention claimed is:

1. A manifold assembly for an electromagnetic valve for mounting a plurality of electromagnetic valves side by side, the manifold assembly comprising:
a manifold block having a valve mounting surface on which a plurality of fixing regions for fixing the electromagnetic valves are arranged side by side, a bottom surface on a side opposite to the valve mounting surface, and an air supply passage that opens on the fixing regions of the valve mounting surface and is for supplying compressed air to the electromagnetic valves; and
silencer members for suppressing exhaust sound of exhaust discharged from the electromagnetic valves,
wherein the manifold block further includes attachment grooves for attaching the silencer members and a plurality of individual exhaust paths that are branched from the attachment grooves and open on the fixing regions of the valve mounting surface, openings along the axes of the attachment grooves are formed as exhaust ports on the bottom surface of the manifold block, and the silencer members are held in the attachment grooves, and
wherein the individual exhaust paths communicate with the exhaust ports through the silencer members.

2. The manifold assembly for an electromagnetic valve according to claim 1, wherein the attachment grooves are formed along the direction in which the fixing regions are arranged side by side on the valve mounting surface, and the attachment grooves penetrate between both end faces of the manifold block.

3. The manifold assembly for an electromagnetic valve according to claim 2, wherein brackets are detachably fixed to both end faces of the manifold block, and end openings of the attachment grooves that open on both end faces of the manifold block are covered by the brackets.

4. The manifold assembly for an electromagnetic valve according to claim 2, wherein lightening grooves extend on the bottom surface of the manifold block along the attachment grooves, and the exhaust ports are opened in the groove walls of the lightening grooves.

5. The manifold assembly for an electromagnetic valve according to claim 4, wherein elastic members having spring elasticity are attached to the lightening grooves by elastic force in a state that the elastic members are elastically deformed, the elastic members abut on the silencer members in the attachment grooves through the exhaust ports, and the silencer members are thereby held in the attachment grooves.

6. The manifold assembly for an electromagnetic valve according to claim 5, wherein the elastic members are pressed against the silencer members by elastic force generated by the elastic deformation.

7. The manifold assembly for an electromagnetic valve according to claim 2, wherein the silencers members are held in the attachment grooves by being fixed with an adhesive in the attachment grooves.

8. The manifold assembly for an electromagnetic valve according to claim 2, wherein the air supply passage includes a collective air supply path for collectively flowing compressed air to be supplied to the plurality of electromagnetic valves and a plurality of individual air supply paths that are branched from the collective air supply path and open on the valve mounting surface, and the collective air supply path is parallel to the attachment grooves and penetrates between both end faces of the manifold block.

9. The manifold assembly for an electromagnetic valve according to claim 8, wherein the attachment grooves are provided on both sides of the collective air supply path.

10. The manifold assembly for an electromagnetic valve according to claim 1, wherein the silencer members include a sound-deadening material, and the sound-deadening material is disposed at least at the junctions with the individual exhaust paths in the attachment grooves.

11. The manifold assembly for an electromagnetic valve according to claim 2, wherein the silencer members include a sound-deadening material, and the sound-deadening material is disposed at least at the junctions with the individual exhaust paths in the attachment grooves.

12. The manifold assembly for an electromagnetic valve according to claim 10, wherein the silencer members are integrally molded of the sound-deadening material in a stick shape having substantially the same cross-section as the attachment grooves, and have substantially the same axial length as the attachment grooves.

13. The manifold assembly for an electromagnetic valve according to claim 11, wherein the silencer members are integrally molded of the sound-deadening material in a stick shape having substantially the same cross-section as the attachment grooves, and have substantially the same axial length as the attachment grooves.

14. An electromagnetic valve cluster comprising a plurality of electromagnetic valves mounted on the fixing regions of the valve mounting surface of the manifold assembly for an electromagnetic valve according to claim 1.

15. The manifold assembly for an electromagnetic valve according to claim 1, wherein the exhaust ports are open over an entire axial direction of the attachment grooves.

* * * * *